United States Patent [19]

Sato et al.

[11] 3,896,153

[45] July 22, 1975

[54] SYNTHESIS OF QUINONE DERIVATIVES HAVING BIOLOGICAL ACTIVITY

[75] Inventors: Kikumasa Sato, Yokohama; Seiichi Inoue, Fujisawa; Shizumasa Kijima, Tokyo; Kimio Hamamura, Kashiwa, all of Japan

[73] Assignee: Eisai Company, Ltd., Japan

[22] Filed: Mar. 25, 1974

[21] Appl. No.: 454,574

[30] Foreign Application Priority Data
Apr. 6, 1973 Japan................................ 48-38748

[52] U.S. Cl...... 260/396 R; 260/396 K; 260/439 R; 260/613 D
[51] Int. Cl.² .................... C07C 49/64; C07C 49/66
[58] Field of Search ..................... 260/396 R, 396 K

[56] References Cited
UNITED STATES PATENTS

| | | | |
|---|---|---|---|
| 3,549,668 | 12/1970 | Fukawa et al.................. | 260/396 R |
| 3,655,699 | 4/1972 | Rutner............................ | 260/396 R |
| 3,657,287 | 4/1972 | Kawamatsu et al............ | 260/396 R |

*Primary Examiner*—Vivian Garner
*Attorney, Agent, or Firm*—Wenderoth, Lind & Ponack

[57] ABSTRACT

New method for the synthesis of benzo- and naphthoquinone derivatives involving coenzyme Q and vitamins $K_1$ and $K_2$ is provided which comprises reacting a $\pi$-allyl-type halonickel complex compound with 2,3-dimethoxy-5-methyl-6-halo-benzoquinone or 2-methyl-3-halo-1,4-naphthoquinone in an organic solvent. Beneficial advantage of the method relies upon its simplicity of the reaction step with high yield of the desired products.

6 Claims, No Drawings

SYNTHESIS OF QUINONE DERIVATIVES HAVING BIOLOGICAL ACTIVITY

This invention relates to a process for the synthesis of quinone derivatives having biological activity represented by the general formula:

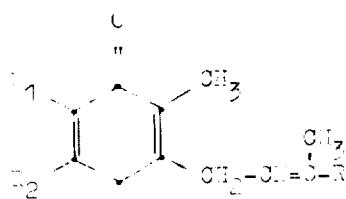

wherein $R_1$ and $R_2$ are methoxy groups or together with the carbon atoms to which they are attached constitute a benzene ring and R is a residue represented by

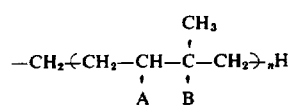

wherein $n$ denotes zero (0) or an integer of from 1 to 9 inclusive, and A and B are hydrogen atoms or together form a direct bonding.

The expression "quinone derivatives having biological activity" as employed herein refers to vitamins $K_1$ and $K_2$ and a series of coenzyme Q compounds, generally known. Accordingly, the present invention concerns the provision of a beneficial method for the synthesis on a commercial scale, of these useful compounds.

As the result of an investigation of the commercial production of vitamins $K_1$ and $K_2$ as well as coenzyme Q compounds, the present inventors had previously discovered a new method for the production, in high yield, of the intermediates for vitamins $K_1$ and $K_2$ and coenzyme Q compounds, wherein a $\pi$-allyl-type halonickel complex compound is reacted with a 1,4-dimethoxymethyl ether for hydroquinone derivatives.

The process of said invention may be represented by the following reaction schema:

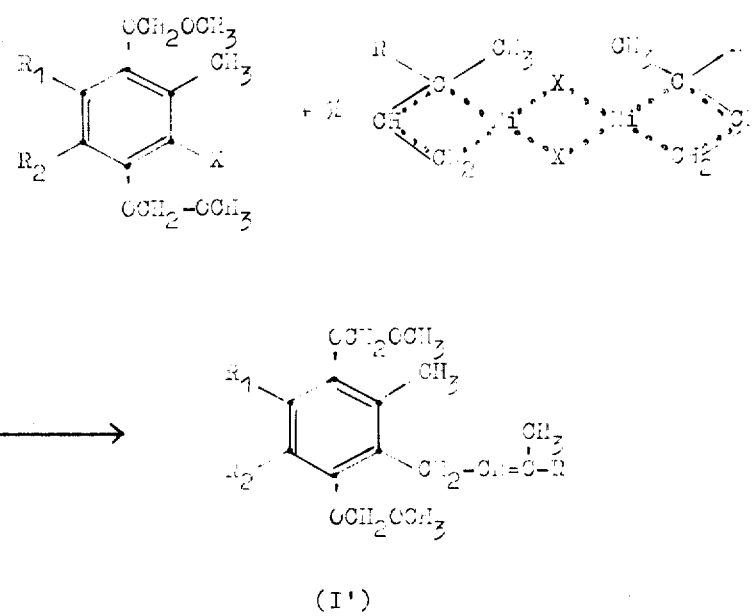

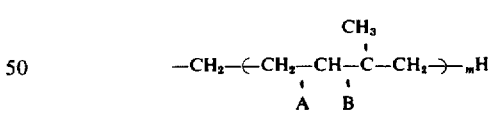

wherein X(s) are halogen atoms; R is the residue represented by

—CH$_2$—(-CH$_2$—CH—C—CH$_2$-)—$_m$H
         |   |
         A   B
             CH$_3$ wherein $m$ denotes zero (0) or an integer of from 1 to 3; $R_1$, $R_2$, A and B have the meanings same as those given to the aforementioned; formula (I) each of the bonds with a single dotted line, ........, represents a half bond and each of the bonds with combined full and dotted lines, ......., represents a half-double bond.

However, in the production of vitamins $K_1$ and $K_2$ and coenzyme Q compounds starting from the intermediates (I') obtained by the abovementioned prior method, there is needed the indispensable steps for splitting off of the methoxymethyl groups contained in said intermediate compounds followed by oxidation.

The present invention has an objective, the effective production of vitamins $K_1$ and $K_2$ and coenzymes $Q_n$ without troublesome steps necessary for splitting off of the methoxymethyl groups followed by oxidation, such as those of the above-mentioned prior art.

The process of this invention may be explained by the following schematic procedure:

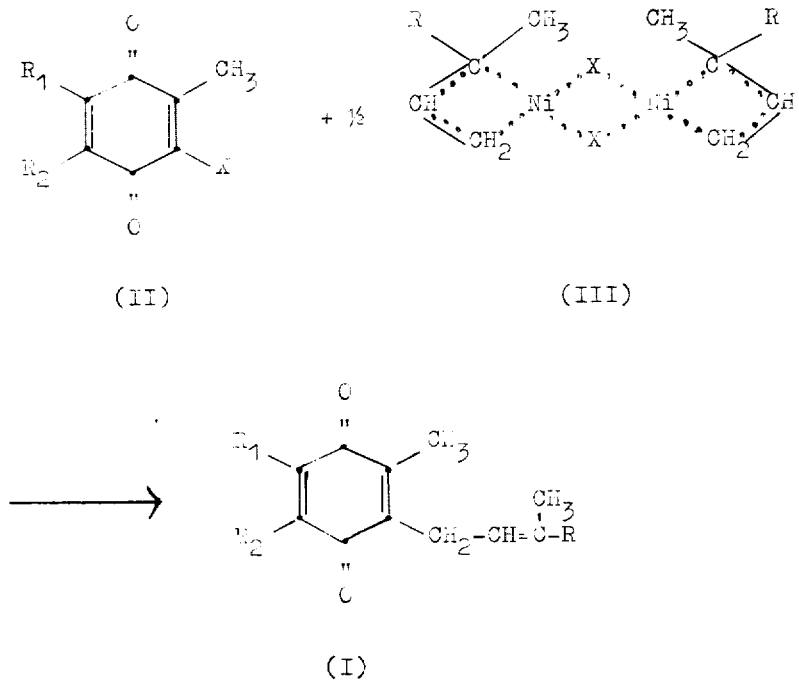

wherein R, $R_1$ and $R_2$ have the meanings same as those given to the aforementioned formula (I); X(s) are halogen atoms; each of the bonds with a single dotted line, ......, represents a half bond and each of the bonds with the combined full and dotted lines, ......, represents a half-double bond.

The process of this invention represented by the above-mentioned schema is conducted by subjecting π-allyl-type halonickel complex compound of the formula (III) to reaction with 2-halo-3-methyl-1,4-quinone compound of the formula (II) in an inert organic solvent.

Solvents for the reaction suitable for carrying out the process of the present invention are those of amide series such as dimethyl formamide, dimethyl acetamide, hexamethyl phosphoramide, N-methyl pyrrolidone and tetramethyl urea as well as a mixed solvent consisting of one of these solvents of amide series and a non-polar solvent such as benzene, toluene, xylene, cyclohexane and the like.

Reaction temperature of from 30°C. to 80°C. and preferably 50°C. to 70°C. may be employed for the performance of the reaction of this invention.

π-Allyl-type halonickel complex compound of the aforementioned formula (III) can be prepared by reacting a halo compound of the isoprene series with nickel tetracarbonyl in accordance with the following chemical equation:

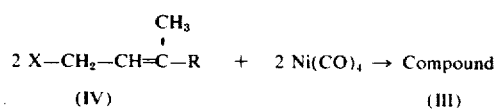

wherein R and X have the meanings same as aforementioned. The reaction is carried out in an inert solvent of benzene series such as benzene per se, toluene and xylene or a solvent of ether series such as tetrahydrofuran and diglyme. The resulting reaction product may directly be used without isolation and/or further purification for the process of the present invention.

As the halo compounds of isoprene series represented by above formula (IV), there may be mentioned in particular the bromo compounds derived from phytol, isophytol, geraniol, linalool, farnesylgeraniol, solanesol, farnesylfarnesylgeranyllinalool and the like.

The essential feature of this invention relies upon the fact that the entire reaction can be conducted in a single step with production of a minute amount of undesired by-products and that the resulting quinone compounds are rich in their trans-form isomers having prevalent biological activity.

The invention will be illustrated by the following Examples.

EXAMPLE 1

Synthesis of 2,3-dimethoxy-5-methyl-6-solanesyl benzoquinone

To a n-hexane solution of bromonickel complex compound prepared from 5.1 g of nickel tetracarbonyl and 13.9 g. of solanesyl bromide, there were added dropwise under a nitrogen atmosphere, a solution prepared by dissolving 5 g. of dimethyl acetamide and 5.2 g. of 2,3-dimethoxy-5-methyl-6-bromobenzoquinone. When the dropwise addition was over, the resulting mixture was held at the temperature of 50°C. for 5 hours for completion of the reaction. After then the reaction mixture was poured into a dilute hydrochloric acid to decompose the unreacted bromonickel complex compound, and extracted with benzene. The benzene extract was dried on anhydrous sodium sulfate and distilled to remove the benzene. 12.4 g. of a yellowish red oil were thus obtained. The oil was purified through silica gel chromatography employing a mixture of n-hexane and benzene. The desired compound was thus obtained as a red oily substance. Yield was 6.1 g. (38.2% of the theory).

The oil when kept in a cold place gradually solidified to yellowish red crystals melting at 34°–36°C.

Elementary analysis for $C_{54}H_{82}O_4$ gave:

|  |  | C | H |
|---|---|---|---|
| Calculated | (%): | 81.56 | 10.39 |
| Found | (%): | 81.51 | 10.45 |

EXAMPLE 2

Synthesis of 2-methyl-3-geranylgeranyl-1,4-naphthoquinone

Bromonickel complex compound prepared from 7.1 g. of geranylgeranyl bromide and 5.1 g. of nickel tetracarbonyl was reacted with 5.1 g. of 2-methyl-3-bromo-1,4-naphthoquinone in accordance with the procedure mentioned in Example 1, with exception that a mixture of n-hexane and isopropyl ether instead of the mixture of n-hexane and benzene, in the chromatography.

There was thus obtained 3.6 g. of a yellow oily substance as the intended compound (yield 42.8% of the theory).

Elementary analysis for $C_{31}H_{40}O_2$ gave:

|  |  | C | H |
|---|---|---|---|
| Calculated | (%): | 83.73 | 9.07 |
| Found | (%): | 83.62 | 9.13 |

EXAMPLE 3

Synthesis of 2,3-dimethoxy-5-methyl-6-decaprenyl-benzoquinone

To a bromonickel complex compound dissolved in n-hexane, which had been prepared from 5.1 g. of nickel tetracarbonyl and 15.2 g. of decaprenyl bromide, there was added dropwise under a nitrogen atmosphere and at the temperature of 50°C. a solution prepared by dissolving 5 g. of dimethyl acetamide and 5.2 g. of 2,3-dimethoxy-5-methyl-6-bromo-benzoquinone in 20 g. of benzene. When the dropwise addition was over, the mixture was further reacted at that temperature for 5 hours. After completion of the reaction, the reaction mixture was poured into a dilute hydrochloric acid to decompose the unreacted π-allyl bromonickel complex compound and then extracted with benzene. The benzene extract was dried on anhydrous sodium sulfate, and the solvent was removed by distillation. There was obtained 13.2 g. of a yellowish red oily substance.

The yellowish red oil was purified through silica gel chromatography employing a mixture of n-hexane and benzene. The contemplated compound was obtained as a red oily substance. Yield was 6.2 g. (35.8% of the theory).

When the product was recrystallized from a fivefold volume of acetone, there were obtained the yellow needles having the melting point of 48°–49°C.

Elementary analysis for $C_{54}H_{90}O_4$ gave:

|  |  | C | H |
|---|---|---|---|
| Calculated | (%): | 82.09 | 10.51 |
| Found | (%): | 82.22 | 10.60 |

What is claimed is:

1. A process for the synthesis of quinone derivatives having biological activity represented by the formula:

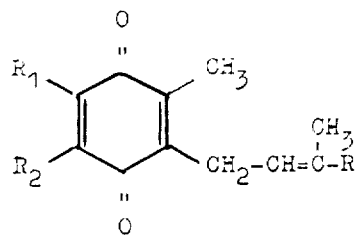

wherein $R_1$ and $R_2$ are methoxy or together with the carbon atoms to which they are attached constitute a benzene ring, and R is

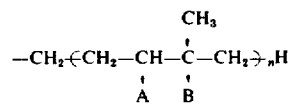

wherein n denotes zero (0) or an integer of from 1 to 9 inclusive, and A and B are hydrogen or together form a direct bond, characterized in that a π-allyl-type halonickel complex compound represented by the formula:

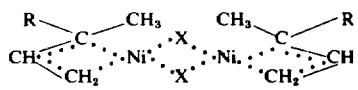

wherein X(s) are halogen, R(s) have the same meanings as aforementioned, and each of the bonds with a single dotted line, ........, represents a half bond and each of the bonds with the combined full and dotted lines, ......, represents a half-double bond, is reacted with a quinone derivative represented by the formula:

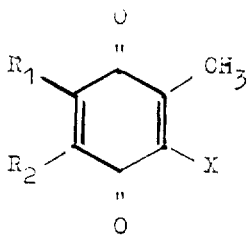

wherein $R_1$, $R_2$ and X respectively have the meanings as aforedefined, at a temperature of 30° to 80°C and in the presence of an amide-type solvent selected from the group consisting of dimethyl formamide, dimethyl acetamide, hexamethyl phosphoramide, N-methyl pyrrolidone and tetramethyl urea, or a mixed solvent consisting of said amide-type solvent and a non-polar solvent selected from the group consisting of benzene, xylene, and cyclohexane.

2. A process as claimed in claim 1 wherein vitamin $K_1$ is produced by reacting phytyl bromonickel complex with 2-methyl-3-bromo-naphthoquinone.

3. A process as claimed in claim 1 wherein vitamin $K_2(5)$ is produced by reacting prenyl bromonickel complex with 2-methyl-3-bromo-naphthoquinone.

4. A process as claimed in claim 1 wherein vitamin $K_2(20)$ is produced by reacting geranylgeranyl bromonickel complex with 2-methyl-3-bromo-naphthoquinone.

5. A process as claimed in claim 1 wherein coenzyme Q(9) is produced by reacting solanesyl bromonickel complex with 2,3-dimethoxy-5-methyl-6-bromobenzoquinone.

6. A process as claimed in claim 1 wherein coenzyme Q(10) is produced by reacting decaprenyl bromonickel complex with 2,3-dimethoxy-5-methyl-6-bromobenzoquinone.

* * * * *